(12) United States Patent
Levine et al.

(10) Patent No.: US 8,401,517 B1
(45) Date of Patent: Mar. 19, 2013

(54) SYSTEM AND METHOD FOR MAINTAINING HIGH SERVICE QUALITY WITHIN A MOBILE WIRELESS COMMUNICATION NETWORK

(75) Inventors: Jonathan Michael Levine, Chicago, IL (US); Jeffrey William Baenke, Arlington Heights, IL (US); Michael Shannon Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 13/412,332

(22) Filed: Mar. 5, 2012

(51) Int. Cl.
*H04M 11/00* (2006.01)
*H04B 3/36* (2006.01)

(52) U.S. Cl. .......................................... 455/405; 455/7

(58) Field of Classification Search ............... 455/7, 453, 455/434, 277.1, 450, 456.5, 456.1, 435.3, 455/422.1, 501, 68; 370/252, 328, 312, 338, 370/329; 340/8.1, 505, 10.5, 10.2
See application file for complete search history.

(56) References Cited

U.S. PATENT DOCUMENTS

| 2010/0195525 | A1* | 8/2010 | Eerolainen | 370/252 |
| 2010/0255773 | A1* | 10/2010 | Halfmann et al. | 455/7 |

* cited by examiner

*Primary Examiner* — Kiet Doan
(74) *Attorney, Agent, or Firm* — Leydig, Voit & Mayer, Ltd.

(57) ABSTRACT

A method for managing service quality provided by a mobile wireless network including a population of base station transceivers and associated antennas at a radio frequency interface to mobile wireless devices is described. The method includes acquiring data volume and connection attempts demand information from the base station transceivers. The data volume and connection attempts demand parameter values are analyzed to render statistical values for these two types of demand parameter values. Thereafter, trigger points for data volume and data connection attempts demand are established based upon the statistical values for these two respective types of demand information. The data volume and connection attempts demand trigger points are applied, respectively, to the individual data volume demand parameter values and the individual connection attempts demand parameter values to render a list of transceivers having parameter values exceeding both the data volume and connection attempts demand trigger points.

22 Claims, 5 Drawing Sheets

| Time Period | Cell ID | Transceiver/Sector ID | Location/Region/Area | Connection Attempts | Transmitted Data Volume | Average Supported Data Rate | Average Maximum Download (Burst) Rate | Average Channel Quality Indicator | Percentage of Data Transmission Capacity Utilized |
|---|---|---|---|---|---|---|---|---|---|
| 150 | 152 | 154 | 156 | 158 | 160 | 162 | 164 | 166 | 168 |

FIG. 2

SYSTEM AND METHOD FOR MAINTAINING HIGH SERVICE QUALITY WITHIN A MOBILE WIRELESS COMMUNICATION NETWORK

FIELD OF THE INVENTION

This invention relates generally to the field of mobile wireless communications networks. More particularly, the invention is directed to supporting mobile wireless data communication services (such as those supporting data flows to/from smart phones) in such networks, and more specifically to managing the wireless signal transmission and reception infrastructure (i.e., cell sites) within the mobile wireless networks.

BACKGROUND OF THE INVENTION

Changes in usage patterns by customers of mobile wireless communications services, with an increased emphasis on smart phone-based data traffic as opposed to voice, have placed unprecedented demand upon underlying physical network infrastructures that support such services. Proliferation of smart phones, and their subsequent use to carry out high volume/data-rate communications—including streaming video transmissions—has resulted in exponential growth in the volume of data flowing over wireless networks. The substantial increased data transmission volume via existing physical networks is challenging the capabilities of the infrastructure to a degree that was not contemplated when mobile wireless services were primarily used to support voice communications. The increased volume of data communications presents a challenge for service providers who must ensure reliable mobile wireless service for most, if not all, users.

Moreover, users have become accustomed to receiving mobile wireless service at unprecedented levels of quality and reliability. The high degree of reliability achieved by mobile wireless services has resulted in many mobile wireless subscribers foregoing conventional landline service. Such subscribers rely wholly upon mobile wireless service to meet their communication needs, or at least to meet their voice communications needs. Given the increased reliance of subscribers, it is imperative for the underlying mobile wireless network infrastructure to be properly maintained. When parts of the mobile wireless network infrastructure are unable to adequately support subscriber needs at particular locations in the network, such parts (e.g., cell sites or portions thereof) must be quickly identified. Thereafter, the cause(s) of the identified performance failure need to be identified and addressed. However, identifying the cause of poor data transmission service and the remedy for the poor service is not a trivial endeavor.

SUMMARY OF THE INVENTION

Embodiments of the invention are used to provide a method, non-transitory computer readable medium, and computer system for managing service quality provided by a mobile wireless network including a population of base station transceivers and associated antennas at a radio frequency interface to mobile wireless devices. The method performed by the system includes acquiring, via a communications network infrastructure for the mobile wireless network, demand information from the population of base station transceivers. The demand information includes individual data volume demand parameter values and data connection attempts demand parameter values for the population of base station transceivers.

After acquiring the demand information, the method performed by the computer system includes analyzing the data volume demand parameter values and the data connection attempts parameter values to render statistical values for these two types of demand parameter values for the population of base station transceivers. Thereafter, the method performed by the computer system includes establishing trigger points for data volume demand and data connection attempts demand based upon the statistical values for these two respective types of demand information provided by the population of base station transceivers.

Thereafter, the method includes applying the data volume demand trigger point and the data connection attempts demand trigger point, respectively, to the individual data volume demand parameter values and the individual connection attempts demand parameter values to render a transceiver candidate list, wherein the transceiver candidate list contains transceivers having parameter values exceeding both the data volume demand trigger point and the data connection attempts demand trigger point.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 2 is an exemplary set of data fields identifying types of data potentially utilized to carry out exemplary systems;

FIG. 4a is a volume histogram depicting quantity of transceivers having particular ranges of data throughput at individual mobile wireless base station transceivers for a sampled population of base station transceivers;

FIG. 4b is a chart summarizing the raw and statistical data depicted in FIG. 4a;

FIG. 5a is a connection attempts histogram depicting quantity of receivers having particular ranges of connection attempts at individual mobile wireless base station transceivers for a sampled population of base station transceivers; and FIG. 5b is a chart summarizing the raw and statistical data provided in FIG. 5a.

DETAILED DESCRIPTION OF THE DRAWINGS

Figure 1:
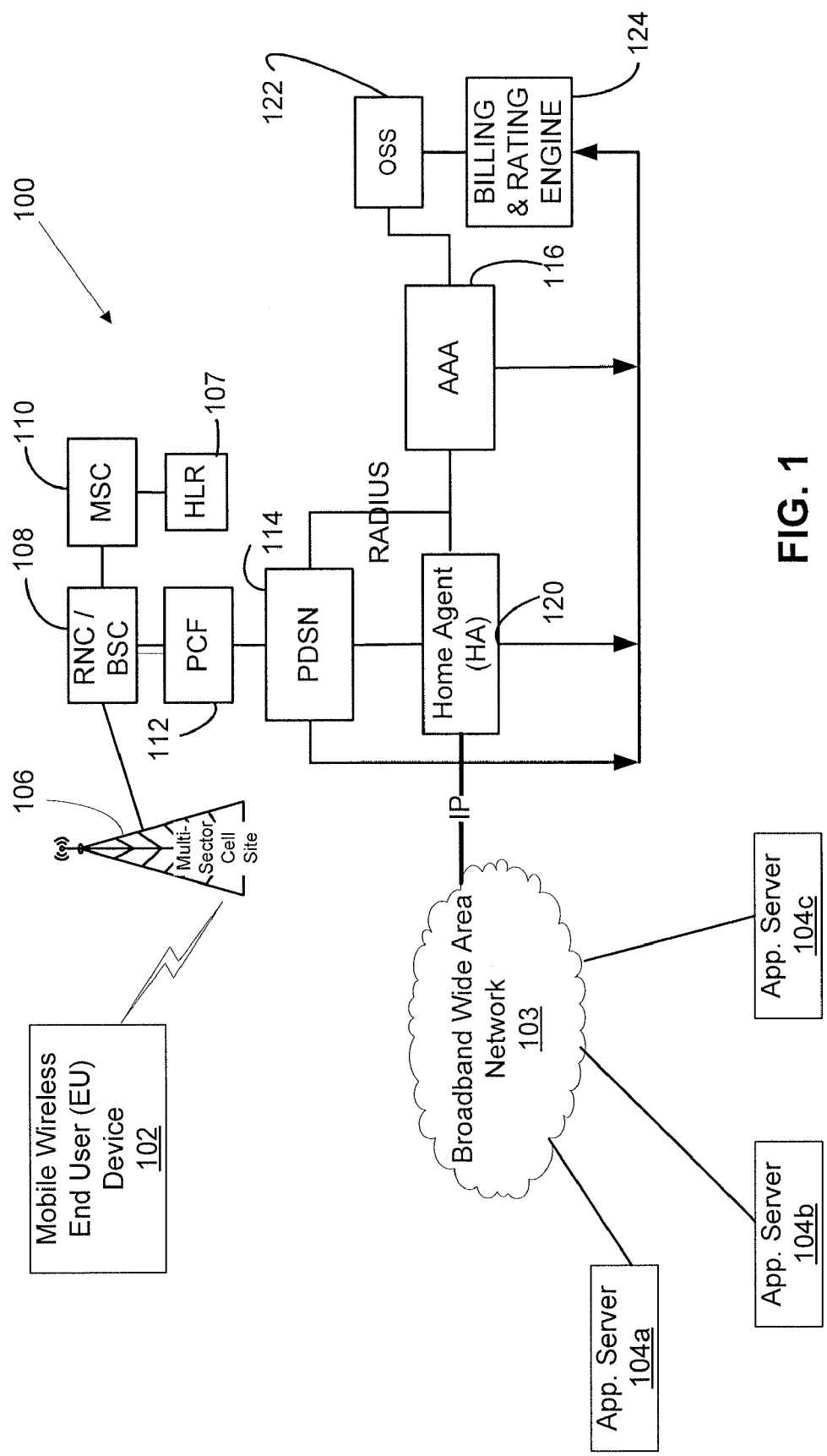
FIG. 1 is a schematic diagram illustrating a mobile wireless network environment interfacing a broadband digital data network to which a variety of application servers are coupled and are accessed by mobile wireless devices capable of performing data communications that potentially consume substantial data bandwidth (e.g., video streaming to smart phones, tablets, netbooks, notebooks, etc.) in accordance with an embodiment of the invention.

Exemplary embodiments of the invention described herein acquire and process a combination of signaling demand (e.g., connection attempts by end user devices) and data volume demand (e.g., bytes of data transferred through the network to end user devices) at individually identified base station transceivers (e.g., sectors) within a mobile wireless network system over a designated period of time (e.g., a peak hour of the day) to identify a set of candidate cell sites, and more particularly transceivers/sectors within cell sites, for which physical signal quality analysis is performed for purposes of identifying poor performing high demand transceivers. Of the candidate transceivers/sectors, those exhibiting unsatisfactory radio frequency signal quality (as measured by signal quality parameters provided by end user devices communicating with the transceivers of interest) are targeted for remedial attention (e.g., radio frequency signal transmission/reception optimization) to raise radio frequency signal quality of the subsequently identified transceivers to an acceptable level. Signal quality optimization is just one of several potential remedial actions taken in response to identification of any poor performing/high demand transceiver.

In exemplary embodiments, the set of candidate transceivers/sectors are established by a statistical analysis of a collected set of data points for signaling demand and data volume demand parameter values provided for a sampled population of transceivers (sectors). The statistical analysis identifying the set of candidates, for analysis of radio frequency signal quality, is expressly distinguished from a basic threshold-based candidate identification scheme that identifies candidate transceivers based upon specified parameter values for signaling demand and data volume demand thresholds (e.g., a specified percentage of the population or a particular absolute value). Thus, a particular percentage designation (e.g., top 1 percent) would not be selection of candidates by a statistical analysis, nor would designating a threshold using a particular value for data volume demand or connection request demand constitute selection of candidates by a statistical analysis.

Moreover, the set of identified candidates (e.g., base station transceivers) are compared to pre-engineered neighbor plans to generate an identification of areas (as opposed to individual transceivers) where remedial attention (e.g., radio frequency optimization) is needed. Pre-engineered neighbor plans comprise lists generated by an engineer for each transceiver (sector) that identify, with priority, the best neighbor transceivers (sectors) at the edge of the serving transceivers (sectors) radio footprint. The pre-engineered neighbor lists are sent to the mobile device over-the-air to indicate new sectors for which the mobile wireless device should search when traveling between cells within the mobile wireless communication network. The pre-engineered neighbor lists provide the mobile wireless device with a list of transceivers that are best candidates for handing over a current session (between participating cells/transceivers) without interruption of mobile wireless service.

In embodiments of the invention, the candidate listings and subsequently identified transceivers/sectors are used to remedy problematic areas in real time, potentially without human intervention. The statistical analysis provides an initial set of candidates (for examination of actual RF signal quality) with a higher level of assurance that the remedial action is needed for the cell transceiver/sector, and not merely desirable, to ensure limited remedial resources are directed to areas where they will have an appreciable impact upon the overall service provided to mobile wireless network end users.

Based on the statistical analysis and correlation with neighbor list priority (provided by pre-engineered neighbor plans), automated management operations are executed, in an exemplary embodiment, to remotely control one or more transceivers of interest (i.e., needing remedial actions) to change electrical tilt, output power, and/or azimuth (for an identified transceiver/antenna) to attempt a network radio frequency signal performance improvement. Since the network management infrastructure for a mobile wireless network constantly captures signal quality statistics, the transceiver signal transmitter/receiver modification feature allows the radio access portion of a mobile wireless network to automatically (based upon provided statistical parameter values) determine when optimization changes are effective (or not) based on mobile wireless device measurements. Moreover, in addition to changing physical parameters (e.g., antenna power, tilt, azimuth), automated network administration components also tune the aforementioned pre-engineered neighbor plans to address bottlenecks or other data communcations traffic-related issues having a substantial impact upon overall mobile wireless network service quality.

Therefore, the automated optimization management feature of the described system attempts optimization implementation according to a statistically substantiated scientific method. That is, a decision to take remedial action with regard to any particular transceiver is based upon: gathering relevant raw data information (e.g., data volume and signaling demand), performing a statistical analysis on the raw data information to identify a set of outlying members of the population, determining remedial actions based on further information acquired for the identified outlying members, testing the effect of the remedial actions, and confirming improvement or attempting a next alternative remedial action (if available). The automated implementation of remedial actions aspect of the exemplary embodiment also comprises an automated logging/reporting component. Such logging/reporting enables engineers to view/review the performance of their currently specified parameter values for statistically analyzing the population of transceivers and the effectiveness of the various types of remedial actions. Using the feedback from the logging/reporting component to tune/configure the identification and remediation definitions to ensure that limited network management resources are effectively deployed to provide high quality service to mobile wireless device users.

Turning to FIG. 1, a network environment is schematically depicted that includes monitoring and management components facilitating the aforementioned detection and maintenance functionality. The illustrative embodiment includes a mobile wireless network system 100 that incorporates, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of LTE, WCDMA, UMTS, GSM, GPRS, EDGE, Wi-Fi (i.e., IEEE 802.11x), Wi-MAX (i.e., IEEE 802.16), or similar telecommunication standards configured to deliver voice and data services to mobile wireless end user devices such as, a mobile wireless device 102 depicted in FIG. 1 carrying out wireless communications via a base station 106 (also referred to as a base transceiver station or cell site). While only a single base station 106 is depicted in FIG. 1, the mobile wireless network system 100 includes hundreds of such stations per RNC/BSC 108 and, therefore, thousands of such stations per operator network. The scaling of base stations within the network continues to grow as smaller base station solutions continue to emerge through wireless innovation. (i.e., picocells, femtocells, hotspot solutions, etc).

The mobile wireless network system 100 provides mobile wireless data network services via the base station 106 to the mobile device 102. The mobile device 102 is any of a variety of devices including, for example: a mobile phone, a PDA, or a mobile computer (e.g., a laptop, notebook, notepad, tablet, etc.) having mobile wireless data communication capability.

The mobile wireless system 100 includes a plurality of base stations, such the base station 106. The base station 106, by way of example, includes radio bearer resources and other transmission equipment necessary for wireless communication of information between the mobile device 102 and other network elements. The base station 106 includes one or more transceiver-antenna combinations. In the case of sectorized base stations, two or more transceiver-antenna combinations are provided to cover particular parts of an area (actually a volume of space, discrete coding scheme, or sinusoidal phase offset) covered by the base station 106. A typical arrangement for a cellular communications base station is a tri-sector arrangement where three static areas are arranged in carefully engineered "n" degrees of rotational displacement from one another. Base stations, such as base station 106, come in a variety of forms, and there is no intention to limit the scope of the invention to any particular arrangement. More generally, there is no intention to limit the invention to the exemplary environment schematically depicted in FIG. 1 since the described management system and scheme for detecting problematic cell sites (base stations) and the specific problematic sectors within the cell sites, applies to other types of wireless communications systems including, without limitation, 3GPP2, EVD0 and LTE based mobile wireless network systems.

The mobile wireless network system 100 is, in turn, connected to a broadband wide area network 103. The broadband network 103 provides digital data connectivity to a variety of application servers 104a, 104b, and 104c. The application servers 104a, 104b, and 104c are representative of millions of application server systems (both in-service operator network servers and out-of-operator network servers) providing a variety of Web-based services via the Internet.

Turning attention to particular components of the mobile wireless system 100, a home location register (HLR) 107 provides services for authenticating an identity of the mobile device 102 prior to permitting access to radio access network resources of the mobile wireless system 100. The HLR 107, by way of example, maintains a database of subscribers to the mobile wireless system 100. Each individual subscriber (e.g., each distinctly identified mobile device) entry includes a Mobile Identification Number (MIN) and/or Electronic Serial Number (ESN).

Moreover, for each data access network, radio access network resources are used to control the radio interface aspect of the mobile wireless system 100 that includes the plurality of base stations. Control of the radio interface of the base station 106 within the system 100 is carried out, for example, by a radio network controller (RNC) or a base station controller (BSC), identified in FIG. 1 as RNC/BSC 108. The RNC/BSC 108 manages the radio traffic between neighboring ones of a plurality of base stations such as the base station 106. Such management of radio traffic includes controlling handoff between sectors and/or base stations.

Additionally, the mobile wireless system 100 illustratively depicted in FIG. 1 includes a mobile switching center (MSC) 110. The MSC 110 manages voice calls placed in and out of the mobile wireless system 100.

Continuing with the illustrative schematic depiction of the wireless network 100, a packet control function (PCF) 112 is communicatively coupled to the RNC/BSC 108. The PCF 112 carries out the function of routing data packets from the RNC/BSC 108 to one of a set of PDSNs. The RNC/BSC 108 is, by way of example, collocated with a packet control function (PCF) 112. It is noted that in the illustrative example, the system 100 is depicted as having a single packet data serving node (PDSN)—i.e., PDSN 114, and in such instance the PCF 112 is not needed to perform the aforementioned routing to a particular one of multiple PDSNs. However, in cases where a wireless system comprises multiple PDSNs, the PCF 112 selectively routes data packets received from the RNC/BSC 108 to an appropriate one of the set of PDSNs for further processing.

The illustrative mobile wireless system 100 includes one or more services (implemented in the form of computer executable instructions carried out by processors on one or more physical server machines) that authenticate and determine/designate access rights for particular identified entities prior to granting access to the mobile wireless system 100's data network transmission services. In the exemplary embodiment, such authentication services are provided by an accounting authentication authorization (AAA) service 116.

The AAA service 116 carries out the task, during set up of a session for an identified subscriber, of ensuring that the subscriber associated with the mobile device 102 is allowed to use the data resources of the system 100. After initially confirming the authenticity of the identified user seeking to establish a user session, the AAA service 116 provides a response including a profile for the identified user including, among other things, user permissions. The permissions can be implicit—e.g., the user is identified as belonging to a particular group—or explicitly listed in the profile assigned to the system.

Upon completion of the user authorization process for the use of data resources, via the PDSN 114 and AAA service 116, a home agent (HA) 120 forwards an IP address, received from the AAA server 116, to the PDSN 114. The PDSN 114, in turn, forwards the IP address to the mobile device 102. In the illustrative example, the HA 120 is a router located on a home network of the mobile device 102. The HA 120 tunnels packets from the home network to the mobile device 102 when the mobile device 102 is roaming.

An Operating Support System (OSS) 122 serves as a central point for administration, management, and provisioning of all network elements. Among other things, the OSS 122 administers the individual accounts of subscribers that use the mobile wireless system 100—including specifying the profile values that determine permissions for users associated with the account with which the mobile device 102 is associated.

In accordance with an exemplary embodiment, the mobile wireless system 100 further includes a billing and rating engine 124. As indicated in FIG. 1, the billing and rating engine 124 is a back office system that is configured to receive certain information, based upon subscriber usage information received from other components of the system 100. The billing and rating engine 124 communicates such information to the OSS 122. By way of example, the billing and rating engine 124 monitors information provided by the HA 120 indicating a particular mode within which the mobile device 102 is (or has been) operating—as well as the quantity of data passed by the mobile device 102 while operating in the indicated mode. The billing and rating engine 124 issues a notification to the OSS 122 that the mobile device 102 is (or has been) operating in a particular mode. The indicated particular operational mode of operation sent to the OSS 122, if not permitted under the current user profile for the mobile device 102, initiates immediate and/or delayed responsive actions by the mobile wireless system 100 to ensure that the mobile device 102 operates in accordance with the terms of a current user agreement.

As those of ordinary skill in the art will realize, the foregoing network elements of the mobile wireless system 100 are implemented via telecommunications equipment having one or more computer processors, as well as non-transitory computer readable media, such as RAM/ROM, solid-state memory, and/or hard drive memory and the like, which store computer executable instructions for executing embodiments of the methods described in further detail below.

Turning to FIG. 2, an exemplary set of fields for a data structure are provided that support management, by an application server (not shown, but represented by the exemplary set of relevant raw and statistical data summarized in FIG. 2) comprising one of more databases for maintaining the raw and statistical data used to identify candidates for further analysis and remedial action. By way of example, the information summarized in FIG. 2 is received from mobile devices and/or base stations and forwarded through the RNC 108 (eventually) to the OSS 122. The application server, whose operation is summarized in FIGS. 3, 4a, 4b, 5a, 5b, and the associated written description herein below, operates upon the acquired raw data to render statistical outliers. The statistical outliers (i.e., the transceivers determined to be in high demand both in actual data volume passing through the transceiver and connection requests handled by the transceiver) are identified by the application server as candidates for further analysis to determine whether remedial action should be taken. In response, the application server (potentially the OSS itself in an LTE network environment) issues remedial actions to be taken by the network, such actions including, without limitation the aforementioned modification of antenna electrical tilt, power, and azimuth. In addition, the application server can issue requests to the pre-engineered neighbor plans to adjust the traffic plan to achieve better overall system throughput/traffic patterns with/without modifications to antenna signal transmission/receiption properties for candidate transceivers (e.g., sectors).

With particular reference to FIG. 2, a time period 150 field of an exemplary database identifies a date and hour with which a particular database entry is associated. In an exemplary embodiment, entries are limited to a peak hour within a day. In other embodiments, alternative time periods are identified, including, for example, a day. Moreover, the database entry for the time period 150 field can represent averaged data over the period of a day (e.g., average of values accumulated hourly). Thus, the time period 150 represents various measures of time in accordance with various alternative embodiments.

With continued reference to FIG. 2, a physical cell ID 152 field and a transceiver/sector ID 154 field provide particular identification of a transceiver/sector for which raw information is being provided. The raw information is described further herein below with reference to the remaining fields summarized in FIG. 2. In an exemplary embodiment, the physical cell ID 152 is associated with a unique pseudo-noise code uniquely identifying the cell. In addition to information identifying a particular transceiver, embodiments include additional information identifying particular physical and/or operational traits of the particular source of raw information (e.g., model name, antenna characteristics, etc.)—virtually any information that might assist the system in identifying a potential candidate for remedial action and the type of remedial action to take (if needed).

In accordance with an exemplary embodiment, additional data fields contain information aiding identification of a particular set of transceivers of interest for identification of candidates. Such information identifies a region (e.g., a group of states), a particular market (e.g., a metropolitan area within a region), a location within a market with which a network administration server (e.g., the RNC/BSC 108) is associated. Such information is stored, for example, in a Location/Region/Area 156 field (or set of fields) maintained by the application server.

Continuing with the description of exemplary fields in a database maintained by an application server, a connection attempts 158 field stores a value indicative of the relative connection attempt demand for a particular identified base station transceiver (sector) uniquely identified by the information provided in at least field 154, but also potentially other fields such as 152 and/or 156 that contain geographic location identifiers. By way of illustrative example, the connection attempts 158 stores a value representing the average hourly connection attempts handled by the identified base station transceiver during a particular day identified in time period 150. However, in alternative embodiments, the value in the connection attempts 158 represents other connection attempt demand parameters such as a peak connection attempt demand during an hour of the identified day. Other time periods and measures of connection attempt demand (e.g., an average over a smaller time period than an hour, a peak demand within a larger time period than a day, etc.) are contemplated in alternative embodiments.

With continued reference to FIG. 2, a transmitted data volume 160 field stores a value indicative of the relative data volume demand for a particular identified base station transceiver (sector) uniquely identified by the information provided in at least field 154, but also potentially other fields (see, above). By way of example, the transmitted data volume 160 field stores a value representing the average hourly transmitted data volume (average total bytes during the hour intervals) within an identified day within time period 150. However, in alternative embodiments, the value in the transmitted data volume 160 represents other data volume demand parameters such as a peak data volume demand during an hour of the identified day. Other time periods and measures of data volume demand (e.g., an average over a smaller time period than an hour, a peak demand within a larger time period than a day, etc.) are contemplated in alternative embodiments.

Yet other fields provide information assisting in determining whether remedial actions are needed or effective to improve data transmission service via the identified base station transceiver. These values tend to be representative of the RF signal quality provided by the transceiver's associated antenna. Such values can be hampered by local sources of interference as well as hardware/configuration issues relating to the antenna and related transceiver electronics. With continued reference to FIG. 2, an average supported data rate 162 stores a value indicative of average supported data rate by the transceiver. An average maximum supported download (i.e., burst) rate 164 stores a value indicative of average burst data rate supported by the transceiver in the download (e.g., data streaming) direction. Yet another potential RF signal quality parameter is stored in an average channel quality indicator 166. The average signal quality is a parameter value measured periodically by mobile wireless devices and reported to transceivers with which they are communicating.

With continued reference to FIG. 2, a percentage of transmission capacity utilized 168 field is utilized to determine the urgency of needed remedial actions. By way of example, the value in the percentage of transmission capacity utilized 168 specifies a percentage of the identified base station transceiver's maximum airlink capacity that is utilized during the identified time period. A high percentage value generally indicates an urgent need to perform some type of remedial action to increase the ability of the transceiver to handle the recorded data volume demand.

Figure 3:
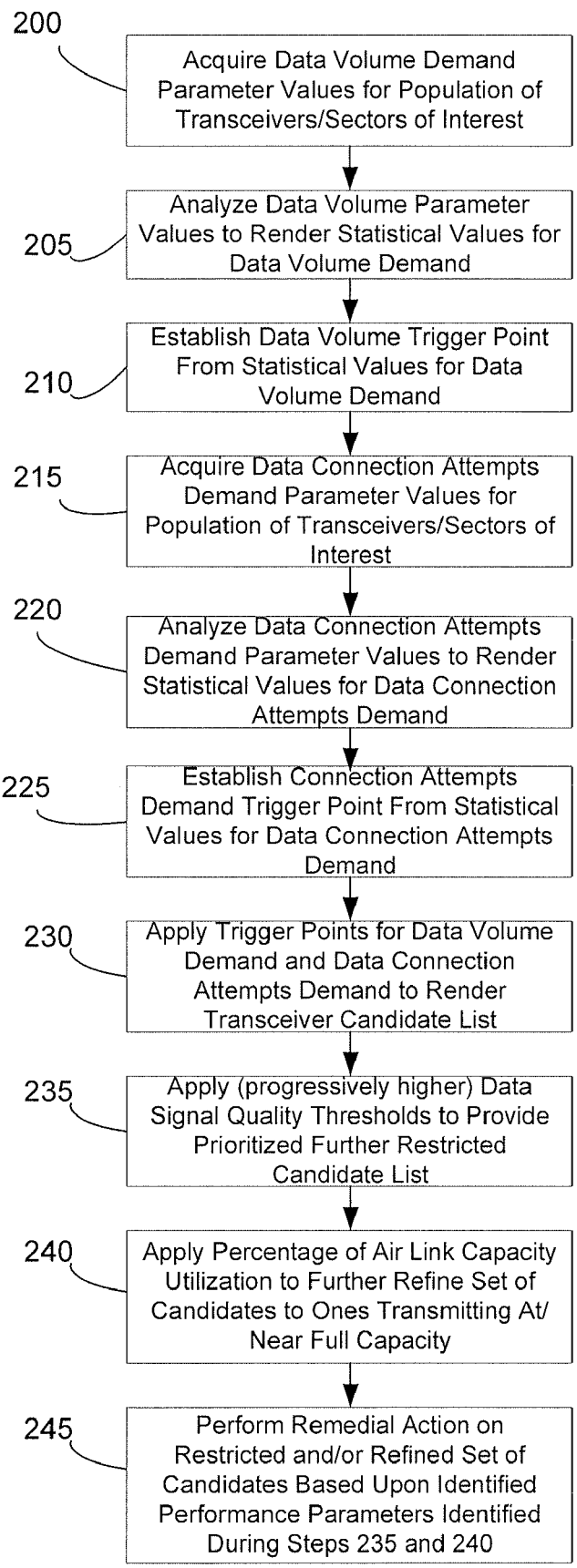
FIG. 3 is a flowchart summarizing a set of steps for carrying out a method of maintaining high service quality in a mobile wireless network.

Turning to FIG. 3, a flowchart provides a summary of a set of input data sets and operations performed for initially identifying candidate transceivers/sectors for further analysis and implementation of remedial signal optimization actions (e.g., transceiver antenna tuning, transceiver equipment upgrade, RF signal shielding from local signal interference source, etc.). In the exemplary method summarized in FIG. 3, during step 200 a first set of data volume parameter values (e.g., megabytes of data transferred/transmitted through a particular identified transceiver on average per hour over the course of an identified day) are acquired for a population of transceivers/sectors. An exemplary population is, for example, obtained by identifying a set of cell sites within a particular market (e.g., a designated urban area and its surrounding suburbs). Thereafter, during step 205, a statistical analysis is commenced on the data volume parameter values, acquired during step 200, to render a set of statistical values that are used thereafter to establish a data volume trigger point (during step 210) for identifying data volume-based qualified transceivers/sectors (during step 230). The statistical analysis performed during step 205 is described herein with reference to FIGS. 4a and 4b.

Figures 4A, 4B:
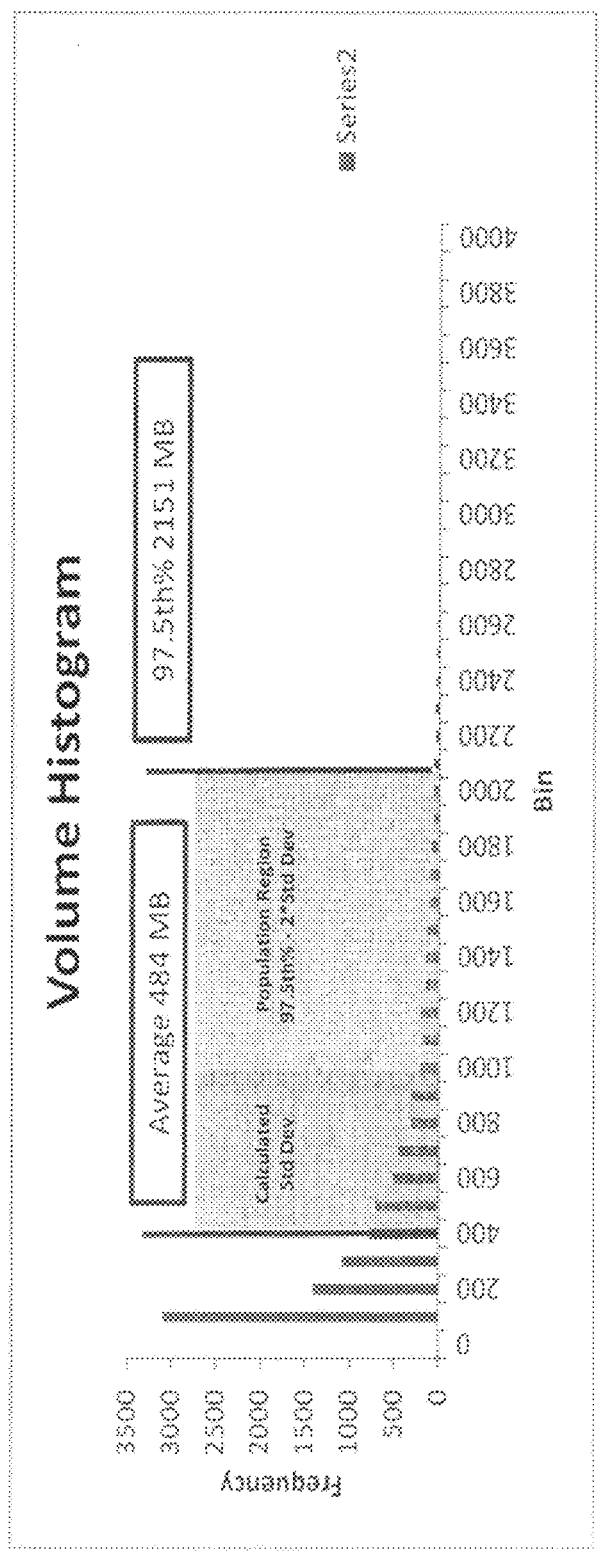

In particular, a set of volume parameter values for a population (e.g., thousands) of transceivers/sectors (graphically represented in a Volume Histogram presented in FIG. 4a) are processed to provide a set of values for performing a data volume statistical analysis on the population to identify a list of transceivers meeting a first statistically established threshold for candidates for further performance analysis. As shown in FIG. 4a, recorded volume for the transceiver/sector population is presented as a set of bars representing a number of transceivers/sectors having a recorded data volume falling within an indicated range (in increments of 100 MB). In the example, the most common actual data throughput values were in the 100-199 MB range. The highest throughput in the provided example was in the 2600-2699 range. As shown in the chart in FIG. 4b summarizing the statistical analysis on data volume values for the sample population, the median is 262 MB and the average/mean is 484 MB. Using the previously calculated average volume, and the individual volume values of the population, a standard deviation is determined, in the particular example, to be 593 MB. In accordance with an exemplary embodiment, the data volume value delimiting a group representing the highest percentile of the population (e.g., 97.5% percentile or top 2.5%) is determined to be 2,152 MB. These values are summarized in the chart depicted in FIG. 4b.

Next, during step 210 a trigger point for identifying data volume-based qualified transceivers/sectors is calculated from the statistical values obtained during step 205. In the exemplary embodiment, the data volume trigger point (VTP) is calculated from the 97.5% (highest population) volume (VH) and the standard deviation (VSD) according to the equation (1):

$$VTP=VH-2*VSD \quad \text{(equation 1)}$$

In the example, the value for VTP (in megabytes) equals 2152−2*593=2152−1186=966 MB. Using a statistically high volume point (e.g., the 97.5 percentile) and then reducing the statistically high point volume value by two standard deviations (a statistical value driven by the spread in values provided for the population) generally ensures that the trigger point (VTP) is sufficiently lowered from the identified highest volume point (VH) when a large spread exists between the highest volume point and the average volume.

Similarly, during steps 215, 220 and 225, a data connections (per day) trigger point (CTP) is calculated from the sample population used to determine the data volume trigger point. The data connections referred to in the exemplary embodiment are standard radio link connection attempts. In a mobile wireless environment, the radio link connections are generally created each time an end user device needs to connect to the radio network actively. The connection is generally maintained long enough to respond to the end user data request. The radio link connection is dropped shortly based on an operator-configured period of time after the request has been satisfied, if no new request is issued by the end user, in order to efficiently utilize connection management resources of the network data communications servers. During step 215 a first set of data connection attempts (on average per hour) parameter values are acquired for the population of transceivers/sectors. Thereafter, during step 220, a statistical analysis is commenced on the connections parameter values (e.g., connections successfully attempted on average in an hour during an identified day) to render a set of statistical values that are used thereafter to establish a connections trigger point (during step 225) for identifying connections-based qualified transceivers/sectors (during step 230). The statistical analysis performed during step 220 is described herein with reference to FIGS. 5a and 5b.

Figures 5A, 5B:
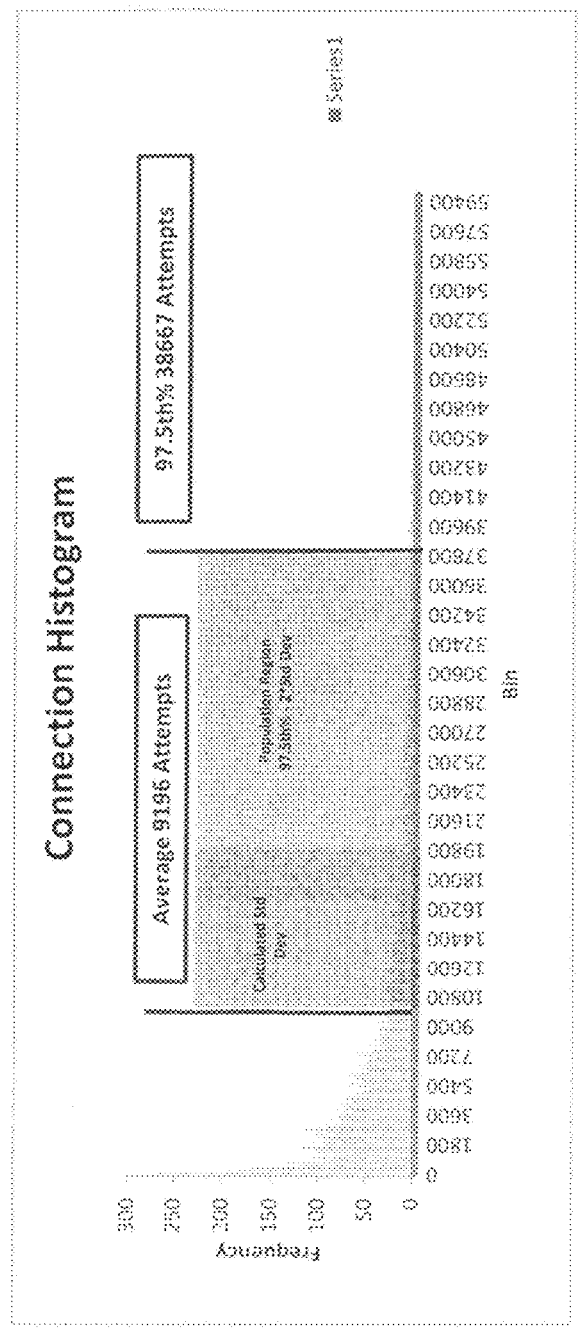

In particular, a set of connections parameter values for a population (e.g., thousands) of transceivers/sectors (graphically represented in a Connection Histogram presented in FIG. 5a) are processed to provide a set of values for performing a data connections statistical analysis on the population to identify a list of transceivers meeting a first statistically established threshold for candidates for further performance analysis. As shown in FIG. 5a, data connections for the transceiver/sector population is presented as a set of bars representing a number of transceivers/sectors having a recorded data connection attempts falling within an indicated range (in increments of 100). In the example, the most common connection attempts per hour (average in an identified day) values provided by the population of transceivers/sectors were in the 0-1000 connection attempts range. As shown in the chart in FIG. 5b summarizing the statistical analysis on data connection attempts values for the sample population, the median is 5,316 connection attempts and the average/mean for connection attempts per hour parameter value is 9,197 connection attempts. Using the previously calculated average connection attempts, and the individual connection attempts values of the population, a standard deviation is determined, in the particular example, to be 10,895 connection attempts. In accordance with an exemplary embodiment, the number of connection attempts delimiting a group representing the highest percentile of the population (e.g., 97.5% percentile or top 2.5%) is determined to be 38,677 connection attempts.

Next, during step 225 a trigger point for identifying data connection attempts-based qualified transceivers/sectors is calculated from the statistical values obtained during step 220. In the exemplary embodiment, the connections trigger point (CTP) is calculated from the 97.5% (highest population) connections (CH) and the connections standard deviation (CSD) according to the equation (2):

$$CTP=CH-2*CSD \quad \text{(equation 2)}$$

In the example, the value for CTP (in average connection attempts per hour) equals 38,677−2*10,895=38,677−21,790=16,887 connection attempts. Using a statistically high connections point (e.g., the 97.5 percentile) and then reducing the statistically high point connections value by two standard deviations (a statistical value driven by the spread in values provided for the population) generally ensures that the trigger point (CTP) is sufficiently lowered from the identified highest connection attempts population segment point (CH) when a large spread exists between the highest connection attempts point and the average volume.

It is noted that the statistical calculations performed during steps 205, 210, 220, and 225 are intended to be exemplary in nature for a statistical approach to identifying candidates in a population of transceivers/sectors. Other coefficients and threshold percentages are used in alternative embodiments that, while differing from the exact equations (1) and (2), maintain a statistical approach that utilizes, for example, a standard deviation to designate a group of interest from an overall population of transceivers/sectors.

Continuing with FIG. 3, after establishing trigger points for volume (VTP) and connection attempts (CTP), the statistically driven analytical process of identifying candidates progresses to step 230. During step 230 the VTP and CTP are applied to the individual data values for transceivers/sectors represented in the population used to determine the VTP and CTP to identify a set of candidates for further analysis (e.g., signal quality, data traffic patterns, etc.) to ultimately determine on an individual transceiver/sector basis whether remedial measures would improve end user service as well as the type of remedial measure. In particular, during step 230, a logical "AND" operation is performed while applying the VTP and CTP to individual transceiver/sector data volume and connection attempt values. If the data volume AND connection attempts values for an individual transceiver/sector exceed the VTP and CTP values, respectively, then that individual transceiver/sector is placed on a list of candidates for further analysis and remedial actions if determined to be needed in view of the further analysis. In the illustrative example, The VTP is 966 MB and the CTP is 16,887. Therefore, any transceiver/sector that provided values exceeding BOTH of these trigger points (e.g., 1100 MB and 20,000 connection attempts) is placed in the candidate list.

The first stages of the procedure summarized herein above with reference to FIGS. 3, 4a, 4b, 5a and 5c are intended to identify a list of candidates for which remedial actions will provide the most impact in terms of enhancing satisfaction of end users taken as a whole. The identification of candidates does not, however, identify what measures can be taken to improve the performance of the identified candidates or even whether remedial actions are even needed.

Continuing with the summarized procedure depicted in FIG. 3, during step 235, further analysis of the identified candidate transceivers/sectors commences wherein a mobile wireless device reported signal quality parameter (e.g., EVDO data rate) is used to identify a potentially poor quality signal transmitted by the identified candidate transceivers. In an exemplary embodiment, a baseline supported data rate is applied to the candidates. In an exemplary embodiment a first threshold quality level (e.g., 800 kbps) is applied to the average supported data rate set forth in the average supported data rate 162 field, for each of the candidate transceivers identified during step 230, to identify transceivers/sectors in need of remedial action. Moreover, in accordance with an exemplary embodiment, if an insufficient number of candidates are identified when the first threshold quality level (e.g., 800 kbps) is applied, then the baseline can be progressively increased (e.g., 1000 kbps, 1100 kbps, etc.) to provide a larger, prioritized, listing of candidate transceivers for which remedial action is needed and carried out during step 245 for the purpose of improving data rate for users (e.g., 800/1000/1100 kbps). The baseline signal quality tests during step 235 are applied to the set of candidates identified during step 230.

Moreover, the various sets of candidates identified during filtering during step 235 are further analyzed to identify the impact of remedial actions (performed during step 245) on the identified candidates. In the illustrative embodiment, during step 240 the percentage of data transmission capacity utilized 168 is consulted for the restricted/filtered base station transceiver candidates established during step 235. For example, if the percentage of a candidate base station transceiver's maximum airlink capacity that is utilized during the identified time period exceeds a specified percentage (e.g., 85 percent), then the transceiver's ability to meet mobile wireless user data volume demand is being strained, and remedial actions (performed during step 245) described previously herein above (either/both automated and manually executed actions) would likely have a substantial beneficial impact on transceiver service quality. Yet another potential qualifier (not shown in FIG. 3, but nonetheless applicable to exemplary embodiments) applied to the initially restricted set of candidate transceivers is the average maximum download (burst) rate supported by each identified candidate transceiver (provided via field 164 for a particular identified candidate transceiver).

It is noted in closing that filtering and processing of a set of initially identified candidates, for purposes of taking remedial actions (both automated and manual) to enhance mobile wireless service quality provided by a network comprising thousands of base station transceivers, is carried out in a wide variety of ways. However, as a starting point, the various embodiments use the initially, statistically rendered, provided listings of candidate transceivers.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for managing service quality provided by a mobile wireless network including a population of base station transceivers and associated antennas at a radio frequency interface:
    acquiring, via a communications network infrastructure for the mobile wireless network, individual data volume demand parameter values for the population of base station transceivers;
    acquiring, via the communications network infrastructure, individual data connection attempts demand parameter values for each of the population of base station transceivers;
    analyzing the data volume demand parameter values to render statistical values for data volume demand parameter values for the population of base station transceivers;
    analyzing the data connection attempts demand parameter values to render statistical values for data connection attempts demand parameter values for the population of base station transceivers;
    establishing, based upon the statistical values for data volume demand, a data volume demand trigger point;
    establishing, based upon the statistical values for data connection attempts demand, a data connection attempts demand trigger point; and
    applying the data volume demand trigger point and the data connection attempts demand trigger point, respectively, to the individual data volume demand parameter values and the individual connection attempts demand parameter values to render a transceiver candidate list, wherein the transceiver candidate list contains transceivers having parameter values exceeding both the data volume demand trigger point and the data connection attempts demand trigger point.

2. The method of claim 1 further comprising applying at least one further filtering criterion to the transceiver candidate list, and thereafter issuing a request to perform a remedial action with respect to a base station transceiver from the transceiver candidate list meeting the at least one further filtering criterion.

3. The method of claim 2 wherein the at least one further filtering criterion comprises a data signal quality threshold.

4. The method of claim 3 wherein the data signal quality threshold is measured by a data transfer rate supported by base station transceivers.

5. The method of claim 3 wherein the data signal quality threshold is measured by maximum download burst rate supported by base station transceivers.

6. The method of claim 2 wherein the at least one further filtering criterion comprises a percentage of air link capacity utilization threshold.

7. The method of claim 2 wherein the remedial action is a remote base station antenna tuning operation.

8. The method of claim 2 wherein the request to perform a remedial action is initiated by wireless network transceiver monitoring and maintenance logic executed by an application server coupled to the mobile wireless network.

9. The method of claim 1 wherein the trigger point statistical values for the data volume demand and the data connection attempts demand include a statistical mean value and a standard deviation value.

10. The method of claim 9 wherein the trigger point values for data volume demand and data connection demand are established by:
    identifying a high demand value at a substantially highest percentage of demand values provided by the population of base station transceivers; and
    subtracting a multiple of the standard deviation value from the high demand value.

11. The method of claim 10 wherein the high percentage value is a value above about 98 percent of the demand values for the population of base station transceivers.

12. A non-transitory computer readable medium including computer-executable instructions for facilitating managing service quality provided by a mobile wireless network including a population of base station transceivers and associated antennas at a radio frequency interface, the computer-executable instructions facilitating performing the steps of:
    acquiring, via a communications network infrastructure for the mobile wireless network, individual data volume demand parameter values for the population of base station transceivers;
    acquiring, via the communications network infrastructure, individual data connection attempts demand parameter values for each of the population of base station transceivers;
    analyzing the data volume demand parameter values to render statistical values for data volume demand parameter values for the population of base station transceivers;
    analyzing the data connection attempts demand parameter values to render statistical values for data connection attempts demand parameter values for the population of base station transceivers;
    establishing, based upon the statistical values for data volume demand, a data volume demand trigger point;
    establishing, based upon the statistical values for data connection attempts demand, a data connection attempts demand trigger point; and
    applying the data volume demand trigger point and the data connection attempts demand trigger point, respectively, to the individual data volume demand parameter values and the individual connection attempts demand parameter values to render a transceiver candidate list, wherein the transceiver candidate list contains transceivers having parameter values exceeding both the data volume demand trigger point and the data connection attempts demand trigger point.

13. The non-transitory computer readable medium of claim 12 further comprising computer-executable instructions facilitating performing the further steps of applying at least one further filtering criterion to the transceiver candidate list, and thereafter issuing a request to perform a remedial action with respect to a base station transceiver from the transceiver candidate list meeting the at least one further filtering criterion.

14. The non-transitory computer readable medium of claim 13 wherein the at least one further filtering criterion comprises a data signal quality threshold.

15. The non-transitory computer readable medium of claim 14 wherein the data signal quality threshold is measured by a data transfer rate supported by base station transceivers.

16. The non-transitory computer readable medium of claim 14 wherein the data signal quality threshold is measured by maximum download burst rate supported by base station transceivers.

17. The non-transitory computer readable medium of claim 13 wherein the at least one further filtering criterion comprises a percentage of air link capacity utilization threshold.

18. The non-transitory computer readable medium of claim 12 wherein the trigger point statistical values for the data volume demand and the data connection attempts demand include a statistical mean value and a standard deviation value.

19. The non-transitory computer readable medium of claim 18 wherein the trigger point values for data volume demand and data connection demand are established by computer-executable instructions that facilitate performing the steps of:
   identifying a high demand value at a substantially highest percentage of demand values provided by the population of base station transceivers; and
   subtracting a multiple of the standard deviation value from the high demand value.

20. A computer system comprising:
   a processor; and
   a non-transitory computer readable medium including computer-executable instructions processed by the processor to carry out the steps of:
   acquiring, via a communications network infrastructure for the mobile wireless network, individual data volume demand parameter values for the population of base station transceivers;
   acquiring, via the communications network infrastructure, individual data connection attempts demand parameter values for each of the population of base station transceivers;
   analyzing the data volume demand parameter values to render statistical values for data volume demand parameter values for the population of base station transceivers;
   analyzing the data connection attempts demand parameter values to render statistical values for data connection attempts demand parameter values for the population of base station transceivers;
   establishing, based upon the statistical values for data volume demand, a data volume demand trigger point;
   establishing, based upon the statistical values for data connection attempts demand, a data connection attempts demand trigger point;
   applying the data volume demand trigger point and the data connection attempts demand trigger point, respectively, to the individual data volume demand parameter values and the individual connection attempts demand parameter values to render a transceiver candidate list, wherein the transceiver candidate list contains transceivers having parameter values exceeding both the data volume demand trigger point and the data connection attempts demand trigger point.

21. The computer system of claim 20 wherein the non-transitory computer readable medium further comprises computer-executable instructions facilitating performing the further steps of applying at least one further filtering criterion to the transceiver candidate list, and thereafter performing a remedial action with respect to a base station transceiver from the transceiver candidate list meeting the at least one further filtering criterion.

22. The computer system of claim 21 further comprising a network interface coupled to a mobile wireless network management infrastructure, the network interface facilitating:
   receiving the data volume demand parameter values and the data connection attempts demand parameter values for the population of base station transceivers; and
   issuing instructions to the mobile wireless network management infrastructure to initiate performing the remedial action with respect to the base station transceiver.

* * * * *